June 15, 1954  J. B. HIRSCHMANN  2,680,846
GOGGLE
Filed Dec. 10, 1952
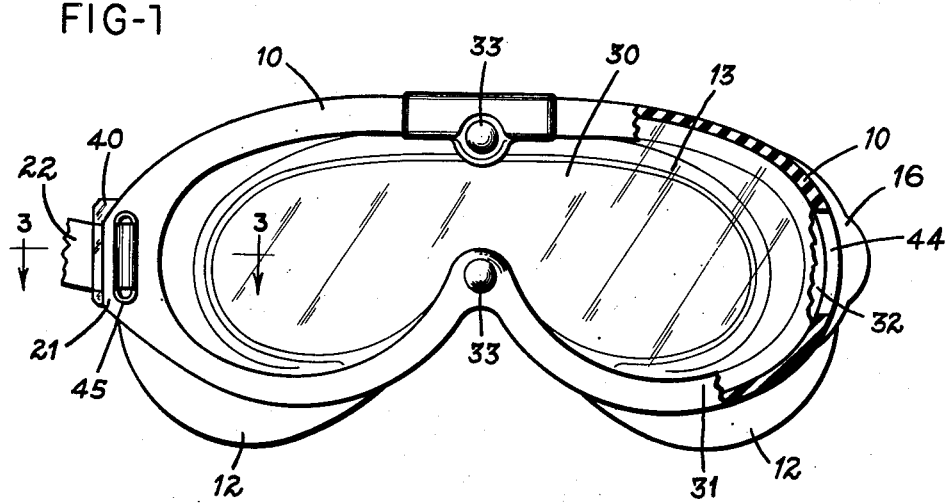
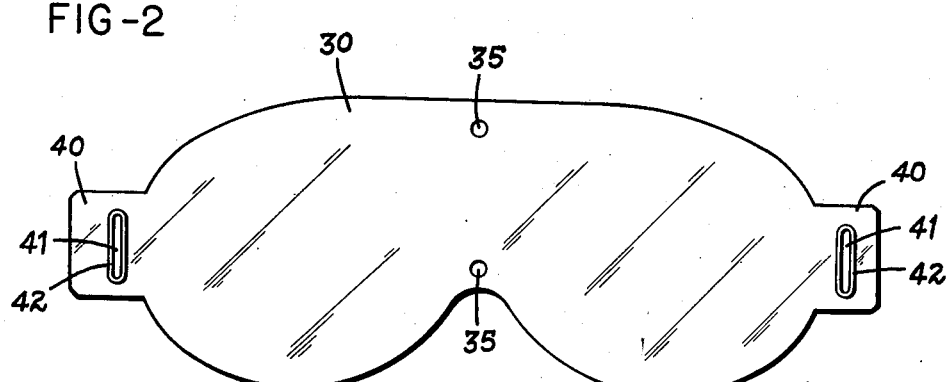
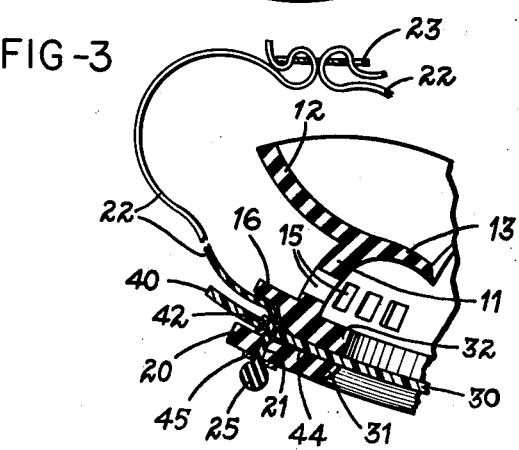
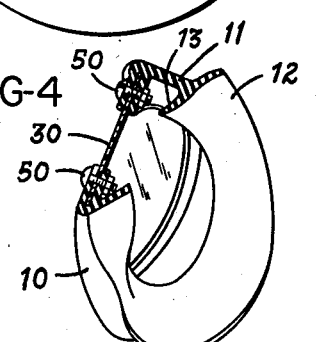
INVENTOR.
JACK B. HIRSCHMANN
BY
Marechal Biebel French & Bugg
ATTORNEYS Patented June 15, 1954

2,680,846

UNITED STATES PATENT OFFICE 2,680,846

GOGGLE

Jack B. Hirschmann, Fairhaven, Mass.

Application December 10, 1952, Serial No. 325,118

7 Claims. (Cl. 2—14)

This invention relates to goggles for eye protection and more particularly to a goggle of the single aperture type having a frame of rubber or other flexible material and a readily replaceable lens of flexible transparent plastic.

The invention has special relation to the connection between the removable lens and the goggle frame in a goggle of this type, and the primary object of the invention is to provide such a goggle in which the lens is positively connected with both the goggle frame and the head strap in such manner as to insure against the possibility of accidental dislodging of the lens in use while at the same time the connection between the lens and the head strap is wholly out of the field of view through the lens.

An additional object is to provide such a goggle in which the pull of the head strap in use is evenly distributed between the lens and the goggle frame in such manner as to prevent both optical distortion of the lens and physical distortion of the frame while at the same time the lens is quickly and easily removable and replaceable in the frame.

It is also an object of the invention to provide such a goggle in which the lens is held in sealed relation with the goggle frame during use around the entire periphery of the viewing area of the lens and in which also this viewing area of the lens is entirely imperforate to prevent leakage of gas or liquid through or around the lens, as is particularly important in a goggle worn for protection against corrosive fluids and the like.

Other objects and advantages of the invention will be apparent from the following description, the accompanying drawing and the appended claims.

In the drawing—

Fig. 1 is a view in front elevation illustrating a goggle constructed in accordance with the invention and with portions broken away substantially on the center of the lens to illustrate details of internal construction;

Fig. 2 is a detail view in front elevation of the lens in the goggle of Fig. 1;

Fig. 3 is a fragmentary section taken on the line 3—3 of Fig. 1 and on a larger scale; and Fig. 4 is a sectional view through the vertical center of a goggle in accordance with the invention for protection against corrosive fluids.

Referring to the drawing, which illustrates a preferred embodiment of the invention, the goggle includes a one-piece frame which is readily molded from rubber or like material of suitable flexibility. This frame includes a front rim portion 10 and a portion 11 which extends rearwardly from the rim to define the eye chamber of the goggle, and the frame portion 11 is in turn provided with double flanges 12 and 13 for engaging the face of the wearer. Ventilation holes 15 may be provided in frame portion 11 and are shown as located behind rib-like baffles 16. At each end of the frame is a lug 20 having a slot 21 therethrough for receiving the head strap 22. The head strap in turn is shown as formed in two parts connected at the back by a buckle 23 and each having a thickened terminal 25 at its forward end.

The rim 10 of the goggle is formed to define a single aperture comprising a pair of enlarged eye portions and a connecting portion of reduced vertical extent at the center of the goggle and above the wearer's nose. A lens 30 substantially complementary in shape to the rim is received therein, and this lens may be formed of a suitable transparent plastic material, satisfactory results having been obtained with cellulose acetate. In order to seal the lens in the frame while still providing for ready removal and replacement thereof, the frame 10 is formed to include an outer flange portion 31 forming a seat for receiving the front peripheral portion of the lens and an inner flange portion 32 which cooperates with flange 31 to define a channel for enclosing the periphery of the lens as best seen in Fig. 3. Also, these flanges 31 and 32 are formed in the center portion of the goggle with extensions of sufficient area to receive cooperating pairs of male and female fasteners 33 such for example as of the well-known "Dot" type, and the lens is accordingly formed with holes 35 therethrough for cooperation with these fasteners.

In order to provide a positive connection of the lens to the goggle frame and the head strap without interfering with the full field of view through the viewing aperture of the rim, the lens 30 is formed at each end thereof with a tab 40 extending laterally from the viewing area of the lens, and each such tab is provided with a closed slot 41 therethrough proportioned to receive the head strap and preferably provided with a suitable reinforcing grommet 42. The lens receiving channel in the rim is in turn formed with a slit 44 extending completely therethrough at each side thereof to receive the adjacent lens tab 40, and these parts are so proportioned that the tabs extend outside of the goggle in underlying relation with the lugs 20 so that the slots 21 and 41 are in alignment with each other in the assembled position of the parts.

With the lens and frame of this construction as shown, the two parts of the head strap may be threaded through the aligned slots 21 and 41 from the front so that the thickened terminal 25 on each strap portion engages the front of the associated lug 20. It has also been found desirable to reinforce this connection by means of a suitably formed grommet or slotted plate 45, which may be of metal or plastic and is threaded on each part of the head strap to lie between the terminal thereon and the front of the adjacent lug 20. It will thus be seen that this arrangement provides a positive interconnection between the lens, the goggle frame and the head strap, while at the same time all the parts of the connection are located entirely outside the field of vision through the viewing area of the lens and thus do not obstruct the vision of the wearer nor permit possible leakage of fluid through the lens such as may occur in the event of a strap-receiving slot located within the viewing area of the lens.

This goggle construction offers important practical advantages from the standpoint of ease of initial fabrication of the parts as well as ease of assembly and/or replacement of the lens in the frame. It also offers important practical advantages in the use of the goggle since the positive interconnection of the lens and frame effectively assures against possible pulling out of the lens and the resulting danger of exposure of the wearer to the hazards against which the goggle is worn. In addition, this construction of goggle frame and lens provides even distribution of the pull of the head strap against both the frame and the lens, since this pull is initially on the lugs 20 but is distributed through them up to the tab portions of the lens. As a result, the lens and frame reinforce each other against both physical distortion of the frame and also against optical distortion of the lens, thus materially contributing to both the comfort and the practical value of the goggle in use.

The present invention is especially advantageous in connection with goggles intended for protection against gas or corrosive liquids as described in my copending application Serial No. 205,327, filed January 10, 1951, now Patent No. 2,648,843, August 18, 1953. For such goggles, initially the same frame may be used as described in connection with Figs. 1–3 but with the ventilation holes entirely omitted as indicated in Fig. 4. Also it is desirable for such uses to employ bolts and nuts 50 of stainless steel in place of the snap fasteners 33. This construction together with the lens 30 as described assures complete freedom of openings in either the frame or the lens through which gas might pass, while at the same time the lens can be quickly and easily replaced when desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a seat for receiving the periphery of said lens, a head strap for supporting said frame on the head of the wearer, said lens having a strap-receiving slot therethrough at each end thereof and in portions thereof located entirely outwardly of the inner periphery of said rim, and said frame having slots therethrough adapted to align with said slots in said lens in the assembled position of said lens and said frame for receiving said strap therethrough to connect said lens and said strap together.

2. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a seat for receiving the periphery of said lens, a head strap for supporting said frame on the head of the wearer, said lens having at each end thereof a strap-receiving slot therethrough in a portion thereof located entirely outwardly of the inner periphery of said seat, and said frame having at each end thereof a slot therethrough adapted to align with the adjacent said slot in said lens in the assembled position of said lens and said frame for receiving said strap therethrough to connect said lens and said strap together.

3. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a seat for receiving the periphery of said lens, a two-piece head strap having thickened terminals at the forward ends thereof, said lens having a strap-receiving slot therethrough at each end thereof and in portions thereof located entirely outwardly of the inner periphery of said rim, said frame having slots therethrough adapted to align with said slots in said lens in the assembled position of said lens, and said strap being threaded through said aligned slots with said thickened terminals thereof engaging the front of said frame adjacent said slots to connect said lens and said frame together.

4. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a channel for receiving the periphery of said lens, a head strap for supporting said frame on the head of the wearer, said lens having a tab at each end thereof located outwardly of the inner periphery of said rim, said rim having a slit at each end thereof in said channel for receiving the adjacent said lens tab therethrough with said tab extending to the outside of said goggle, and said frame and said tabs having aligned slots therethrough at each end of said goggle for receiving said strap therethrough to connect said lens and said frame together.

5. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a seat for receiving the periphery of said lens, a head strap for supporting said frame on the head of the wearer, a lug extending laterally from each end of said rim and each having a slot therethrough for receiving said strap, said lens having a tab at each end thereof located outwardly of the inner periphery of said rim, said rim having a slit at each end thereof adjacent said seat and rearwardly of the adjacent said lug for receiving the adjacent said tab therethrough with said tab extending to the outside of said goggle in underlying relation with said lug, and said tabs having slots therethrough aligned with said slots in said lugs for receiving said strap to connect said lens and said frame together.

6. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a seat for receiving the periphery of said lens, a two-piece head strap having thickened terminals at the forward ends thereof, said lens having a tab at each end thereof located outwardly of the inner periphery of said rim, said rim having a slit at each end thereof adjacent said seat for receiving the adjacent said lens tab therethrough with said tab extending to the outside of said goggle, said frame and said tabs having aligned slots therethrough at each end of said goggle, and said strap being threaded through said aligned slots with said thickened terminals thereof engaging the front of said frame adjacent said slots to connect said lens and said frame together.

7. A goggle comprising a one-piece frame including a front rim portion defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material received within said rim and of substantially complementary shape thereto, means within said rim forming a channel for receiving the periphery of said lens, a two-piece head strap having thickened terminals at the forward ends thereof, a lug extending laterally from each end of said rim and each having a slot therethrough for receiving said strap, said lens having a tab at each end thereof located outwardly of the inner periphery of said rim, said rim having a slit at each end thereof in said channel and rearwardly of the adjacent said lug for receiving the adjacent said tab therethrough with said tab extending to the outside of said goggle in underlying relation with said lug, said tabs having slots therethrough aligned with said slots in said lugs, and said strap being threaded through said aligned slots with said terminals engaging the front surfaces of said lugs to connect said lens and said frame together.

References Cited in the file of this patent

UNITED STATES PATENTS

| Number | Name | Date |
|---|---|---|
| 1,109,398 | Butler et al. | Sept. 1, 1914 |
| 2,388,205 | Burnheim et al. | Oct. 20, 1945 |
| 2,625,685 | Moeller | Jan. 20, 1953 |